United States Patent [19]

La Chance

[11] 3,842,517

[45] Oct. 22, 1974

[54] ELECTRONIC TRAINING & DIAGNOSING APPARATUS

[76] Inventor: Gerard B. La Chance, 35 McClure Pl., Fall River, Mass. 02720

[22] Filed: Jan. 29, 1973

[21] Appl. No.: 327,740

[52] U.S. Cl. .............................................. 35/19 A
[51] Int. Cl. .......................................... G09b 23/18
[58] Field of Search .............. 35/10, 19 R, 19 A, 13

[56] References Cited
UNITED STATES PATENTS

| | | | |
|---|---|---|---|
| 3,043,022 | 7/1962 | Crews et al. | 35/19 A |
| 3,340,620 | 9/1967 | Meade | 35/19 A |
| 3,363,333 | 1/1968 | Alexander | 35/19 A |
| 3,656,242 | 4/1972 | Atkinson | 35/19 A |

Primary Examiner—Wm. H. Grieb
Assistant Examiner—Vance Y. Hum

[57] ABSTRACT

The apparatus is in the form of a box-shaped enclosure having a predetermined circuit diagram including test points illustrated on the front thereof and containing the actual wired circuit therein. The box is completely closed except for a backdoor which may be unlocked to provide access to a switch array which in turn connects to various points in the circuit. In their normal position, the switches of the switch array permit proper operation of the circuit, but any one or more switches may be moved to their fault position for introducing a fault condition into the circuit, such as a shorting of a resistor or an opening of a capacitor.

1 Claim, 9 Drawing Figures

ELECTRONIC TRAINING & DIAGNOSING APPARATUS

FIELD OF THE INVENTION

The present invention relates in general to an electronic training and diagnosing apparatus, and more particularly, to a troubleshooting apparatus preferably for use as a training aid for students wherein an instructor can introduce certain predetermined fault conditions into a known circuit; the student being faced with the task of measuring or monitoring certain parameters of or associated with the circuit to diagnose the introduced fault or trouble.

BACKGROUND & OBJECTS OF THE INVENTION

Typical prior art patents include U.S. Pat. Nos. 3,043,022; 3,071,876; and 3,152,405. The device shown in U.S. Pat. No. 3,043,022, for example, includes a number of electronic components which may be interconnected and has a wiring diagram formed on the face of the device. The instructor may insert jumpers for creating fault conditions and which are concealed from the student. It is usually difficult and time consuming for the instructor to properly prepare the device for the students use. Also, the types of fault conditions than can be introduced are usually limited to shorting components.

Accordingly, it is an object of the present invention to provide an improved electronic training and diagnosing apparatus wherein the proper predetermined fault conditions can be readily established by the instructor without the necessity of interconnecting jumpers.

Another object of the present invention is to provide an apparatus in accordance with the preceding object wherein there is provided a plurality of switching means each connected to different points of a test circuit and being selectively operated by the instructor to introduce different fault conditions into the circuit. These fault conditions can be introduced simultaneously or concurrently.

A further object of the present invention is to provide an electronic training and diagnosing apparatus having an access door to the switching means, means for locking the access door and a wiring diagram formed on the face of the apparatus and depicting the actual wired circuit within the apparatus. Normally, the circuit is a conventional circuit such as an amplifier circuit and when all of the switching means are in their normal position the circuit is properly operable.

Still another object of the present invention is to provide a plurality of test points associated with the circuit diagram for testing different points in the circuit and including means for measuring the total current drawn by the circuit.

Still a further object of the present invention is to provide an electronic training and diagnosing apparatus wherein many different types of fault conditions can be established by the instructor including short circuits, open circuit, introduction of leakage, and introduction of different predetermined resistive or capacitive values.

SUMMARY OF THE INVENTION

To accomplish the foregoing and other objects of this invention, there is provided an electronic diagnostic apparatus which comprises an enclosure having a face wall, a plurality of electronic components interconnected to form a useful circuit, a switch array including a plurality of switches disposed within the enclosure and means interconnecting each switch to at least one of the components of the circuit. In order to provide access to the switch array which is disposed in the enclosure, a door or the like, is provided preferably at the back of the enclosure. A lock is associated with this door so that the student cannot discover the positions of the switches. The electronic circuit is usually a conventional circuit such as an amplifier and a schematic diagram of the circuit is formed on the face wall of the enclosure. Test receptacles are associated with predetermined points of the circuit for measuring or monitoring predetermined parameters associated with the circuit. Each of the switches has at least two positions. When the switch is in its normal position that switch creates no fault condition and when it is moved to its alternate position a fault condition is introduced into the circuit.

One other feature of the present invention is the provision for measuring the total current drawn by the circuit. For that purpose the power supply for the circuit has a ground connection that is broken when it is desired to measure the current drawn by the power supply.

Another feature of the present invention relates to the type of fault condition that is introduced. In one embodiment a multi-position switch is used so that different values of resistors, for example, may be introduced into the circuit.

BRIEF DESCRIPTION OF THE DRAWINGS

Numerous other objects, features and advantages of the invention will now become apparent upon a reading of the following detailed description taken in conjunction with the accompanying drawings in which.

DETAILED DESCRIPTION

Figure 1:
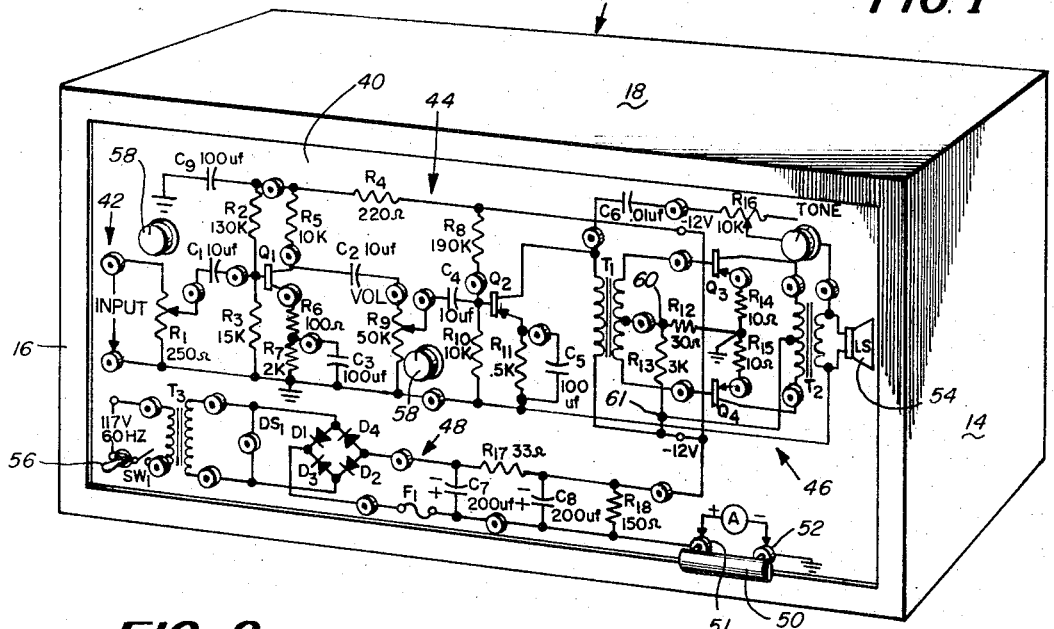
FIG. 1 is a front perspective view of one embodiment of the apparatus of the present invention.
Figure 2:
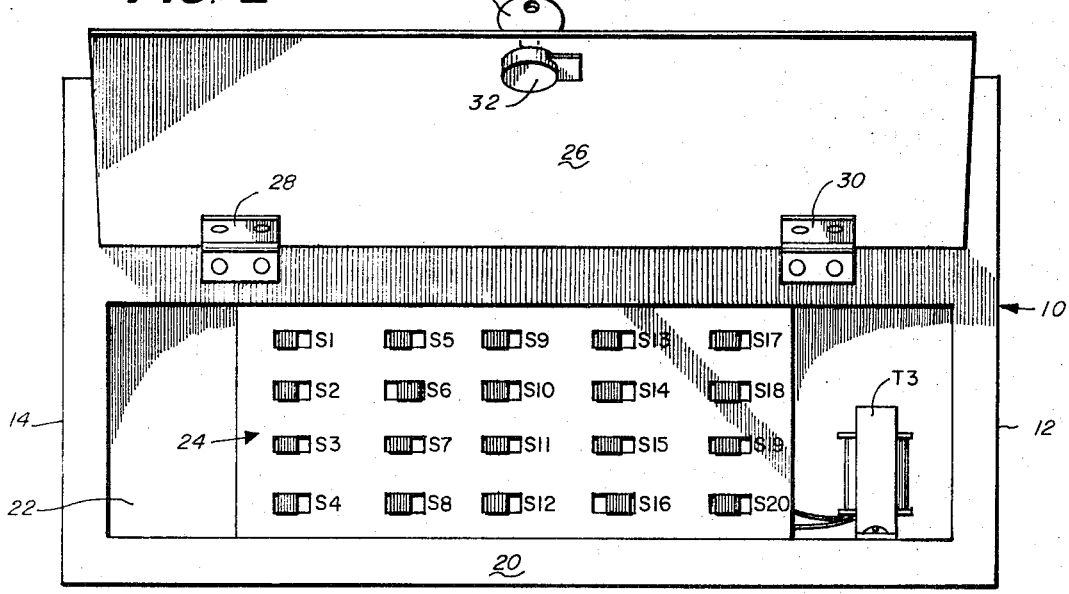
FIG. 2 is a back view of the apparatus shown in FIG. 1 particularly depicting the access door and switch array.

Referring now to the drawings and in particular to FIGS. 1 and 2, there is shown the apparatus of the present invention which includes an enclosure 10 which may be constructed of sheet metal or plastic and comprises sidewalls 12 and 14 facewall 16, topwall 18, and backwall 20. The backwall 20 has an aperture 22 therein which is of rectangular configuration and provides access to switch array 24.

A door 26 is pivotally secured to wall 20 by means of hinges 28 and 30. Door 26 may be moved from the position shown in FIG. 2 to a closed position and a latch member 32 maintains the door 26 in a locked position covering aperature 22. Once the latch 32 has been rotated to secure the door in a locked position the key 34 may be withdrawn and held by the instructor for future use.

In the perspective view of FIG. 1 the front wall 16 includes a front panel 40 which may be a multi-layer panel having the circuit shown in FIG. 1 formed, preferably in ink, on panel 40. The actual circuit components corresponding to the diagram shown in FIG. 1 are contained within the enclosure 10 and, for the sake of simplicity, are not each physically shown in the drawings of this application.

A circuit diagram shown in FIG. 1 is a conventional amplifier circuit including its own power supply. There are a number of test receptacles associated with the circuit, each receptacle connecting by a conductor wire to the actual circuit point as represented by the circuit schematic diagram. The switches S1–S20 shown in FIG. 2 which comprise switch array 24 also connects to different predetermined components of the circuit shown in FIG. 1. For the sake of simplicity, the exact interconnections of all of the switches have not been shown. However, in FIGS. 3–9 representative switch arrangements for introducing different fault conditions are shown.

The amplifier circuit shown in FIG. 1, as previously mentioned, is of conventional design and includes an input section 42, preamplifier section 44 which includes transistors Q1 and Q2, and push-pull section 46 which includes transformer T1 and transistors Q3 and Q4. The amplifier also includes its own power supply 48. Normally, a jumper 50 is inserted in receptacles 51 and 52 for enabling operation of the power supply 48. One of the features of the present invention is the use of this jumper 50 which may be removed and substituted by an ammeter for measuring the current drawn by the power supply 48.

The diagram shown in FIG. 1 also includes a loudspeaker 54, power switch 56, and volume control knobs shown at 58.

Figure 3:
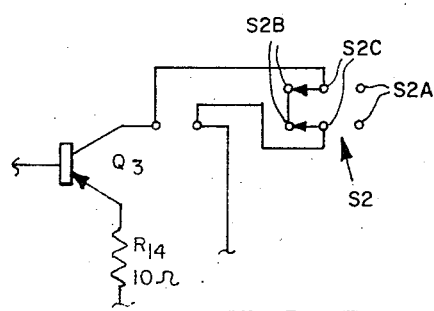
FIG. 3 is a fragmentary view of the circuit shown in FIG. 1 including a switch for introducing an open circuit.

Referring now to FIGS. 3–9, each of these separate figures shows a fault switch and its corresponding connection to the circuit shown in FIG. 1. FIG. 3, for example, shows transistor Q3 and resistor R14 and the switch S2, for example, which can assume either its normal position with the collector of transistor Q3 not opened, or its fault position with the collector opened. Thus, switch S2 includes common contacts S2C and fixed contacts S2A and S2B. Contacts S2B are joined by a jumper wire, and when the switch S2 is in the position shown in FIG. 3 the collector of transistor Q3 is not opened. However, when switch S2 is moved to its fault position the contacts S2A are open and thus the collector of transistor Q3 is open thereby preventing the output signal to feed to the loudspeaker 54 (See FIG. 1).

Figure 4:
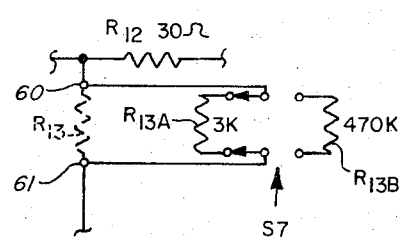
FIG. 4 is a fragmentary view taken from the circuit shown in FIG. 1 and including a switch for introducing a different valued resistor.

In FIG. 4 there is shown a fragmentary view taken from the diagram of FIG. 1 including resistors R12 and R13. FIG. 4 also shows switch S7 which is used to couple either resistor R13A or resistor R13B across terminals 60 and 61 which correspond to the two ends of resistor R13 shown in FIG. 1. In FIG. 4 switch S7 is shown in its normal position wherein resistor R13A is disposed between terminals 60 and 61. In order to create a fault condition, referred to as drift, the switch may be moved to its alternate position wherein resistor R13B is coupled across terminals 60 and 61.

Figure 5:
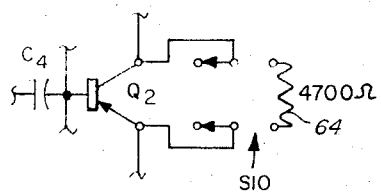
FIG. 5 is a fragmentary view taken from the circuit shown in FIG. 1 and including a switch for adding a resistor to the circuit.

FIG. 5 is another fragmentary schematic showing transistor Q2 and capacitor C4. In FIG. 5 a switch S10, for example, is used to introduce a leakage resistor 64 between the collector and emitter of transistor Q2. In the position shown in FIG. 5 the common contacts of switch S10 are coupled to open fixed contacts and thus transistor Q2 is not affected by the position of switch S10. However, if switch S10 is moved to its alternate position resistor 64 is then coupled across transistor Q2 thereby causing a leakage path across the transistor.

Figure 6:
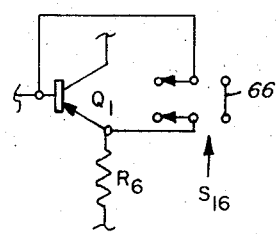
FIG. 6 is a fragmentary view taken from the circuit shown in FIG. 1 and including a switch for introducing a short circuit.

FIG. 6 is another view of a portion of the circuit shown in FIG. 1 including transistor Q1 and resistor R6. This fragmentary diagram also shows switch S16 which has its common contacts coupled to fixed contacts that are open as shown in FIG. 6. If switch S16 is moved to is alternate position the common contacts are shorted out by connector 66 thereby causing a short-circuit between the base and emitter of transistor Q1.

Figure 7:
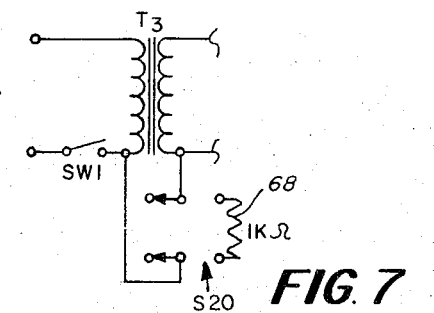
FIG. 7 is a fragmentary view taken from the circuit diagram shown in FIG. 1 and including a switch for introducing a leakage resistor into the circuit.

FIG. 7 shows transformer T3 and power switch SW1. In addition, switch S20 is shown in FIG. 7 and includes a common set of contacts which connect to open fixed contacts in the position shown in FIG. 7. When a fault condition is to be introduced switch S20 is moved to its alternate position wherein resistor 68 is introduced across transformer T3 between its primary and secondary windings.

Figure 8:
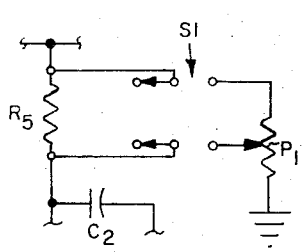
FIG. 8 is a fragmentary view partially taken from the circuit diagram shown in FIG. 1 for introducing another fault condition.

FIG. 8 is another fragmentary view which is partially taken from the schematic shown in FIG. 1. This view also shows a switch S1 which, in the position shown, does not connect potentiometer P1 across resistor R5. However, when switch S1 is moved to its alternate position one end of potentiometer P1 and the wiper arm connect across resistor R5. With this type of switching arrangement shown in FIG. 8 the instructor can introduce potentiometer as a fault across resistor R5 and can also vary the resistance of potentiometer P1 to further complicate the fault condition.

Figure 9:
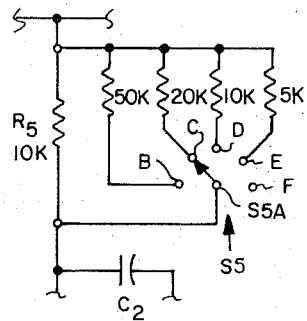
FIG. 9 is a fragmentary view partially taken from the circuit diagram shown in FIG. 1 for introducing still another type of fault condition.

FIG. 9 shows another fragmentary view including resistor R5 and capacitor C2. FIG. 9 shows also a switch S5 which is a multi-position switch having a moveable contact S5A and fixed contacts S5B, S5C, S5D, S5E, and S5F. In the position shown in FIG. 9 the resistor associated with contact S5C is coupled across resistor R5. However, the switch S5 could be moved so that others of the resistors associated with other fixed contacts may be coupled across resistor R5. In addition, by way of example, in FIGS. 8 and 9 switches S1 and S5 have been shown as coupling to resistor R5. However, it should be realized that both of the switches S1 and S5 could couple to other components in the circuit shown in FIG. 1.

In FIG. 2 the switch array 24 is shown as including switches S1–S20. In FIGS. 3–9 only some of these switches have been discussed. Others of these switches connect to other points in the circuit shown in FIG. 1. Also, the switch S5 shown in FIG. 9 may be of a rotary dial configuration rather than a configuration shown in FIG. 2. In another modification of the invention it should be realized that numerous different types of circuits can be used for training purposes other than the one circuit shown in FIG. 1. Also, capacitors, semiconductor devices, inductors or any other electronic component can be substituted for the resistors shown in FIGS. 3–9.

What is claimed is:

1. A training apparatus for use by a student to familiarize the student with certain predetermined faults that may typically occur in a conventional electric or electronic circuit, said apparatus comprising;

a box-shaped enclosure having top and bottom walls, side walls, a facewall and a back wall defining an opening for providing access to the inside of the enclosure, a plurality of components including resistors, capacitors and transistors interconnected by conductor means to form the circuit and being disposed within the enclosure, said circuit being schematically formed on the facewall, a plurality of test receptacles disposed at different points in the circuit and accessible from the facewall to measure parameters of the circuit, means for receiving power to operate the circuit, a switch coupled to said receiving means for selectively applying power to the circuit, means for receiving a meter to measure the power drawn by the circuit when operating, a switch array including a plurality of switches, means for holding the switches in an array within the enclosure and in a position to be operated through the opening in the back wall, means interconnecting each switch to at least one component of the circuit, each said switch having at least two positions one of which introduces a predetermined fault into the circuit, a door for covering the opening in the back wall, means for hingedly supporting the door, and a lock for the door for securing the door in its closed position wherein the student cannot ascertain the positions of the switches, one of said switches comprising a two position switch having a short circuit position and an open circuit position and for connecting to the collector of a transistor to simulate an open collector fault, another one of said switches comprising a two position switch having a resistor associated therewith for selective connection in parallel with either another resistor or capacitor of the circuit to simulate leakage through the resistor or capacitor, another one of said switches comprising a two position switch having a resistor associated therewith for selective connection across the collector and emitter of a transistor of the circuit to simulate leakage of the transistor, another one of said switches comprising a two position switch having a short circuit position and an open circuit position and for connection across the base to emitter of a transistor to simulate a short circuit fault condition.

* * * * *